INVENTOR.
Compere Loveless
ATTORNEY.

United States Patent Office 2,972,413
Patented Feb. 21, 1961

2,972,413

RECIRCULATION CONTROL SYSTEM FOR SEWAGE TREATING APPARATUS

Compere Loveless, Prairie Village, Kans., assignor, by mesne assignments, to Union Tank Car Company, Chicago, Ill., a corporation of New Jersey Filed Nov. 19, 1956, Ser. No. 623,121

1 Claim. (Cl. 210—137)

This invention relates generally to the field of sewage treating or purifying apparatus and, more particularly, to such apparatus wherein is provided a recirculation system and automatic control means therefor.

Since much of the basic structure of the sewage treating apparatus to which the recirculation system and control means of this invention are applied may be the same or similar to that disclosed in my U.S. Letters Patent No. 2,758,875, issued August 14, 1956 and entitled "Combined Center Column and Distributor for Sewage Treating Apparatus," this invention may be regarded as an improvement over the invention of my said patent.

In sewage treating apparatus of the type in question, the flow of sewage material from an external source to the means for distributing same onto the filter bed is, in many applications, intermittent. Thus, the distributing and aerating portions of the apparatus tend to be idling during substantial intervals of time. It has been found that the distributing and aerating functions of the apparatus may be rendered substantially continuous, with resultant increase in the purifying efficiency of the apparatus by providing for recirculation of sewage material through the distributing and aerating apparatus during periods when the capacity of the latter is not already being used by new sewage material being introduced from an external source.

Accordingly, it is the primary object of this invention to provide such improved sewage treating apparatus in which such recirculating means are embodied.

It is another important object of the invention to provide a recirculation system for sewage treating apparatus of the class in question which includes pump means for withdrawing sewage material from the system and returning the same to the distributing and aerating structure for redistribution and return to the filter bed.

It is another important object of the invention to provide such a recirculation system in which is incorporated an electrically operated prime mover for the pump and an electrically responsive control system coupled with the operating circuit for the prime mover for activating the latter only when the capacity of the sewage distributing structure is not already being fully utilized in handling incoming new sewage material from an external source.

It is another important object of the invention to provide such control means which utilize a number of electrically conductive electrodes disposed within the sump or collecting tank portion of the distributing structure, which electrodes are coupled in the control circuitry for the prime mover and are adapted to be electrolytically connected with each other in various fashions depending upon the depth of sewage material within the sump tank awaiting distribution into the filter bed.

Another important object of the invention is to provide such a controlled recirculation system for sewage treating apparatus, wherein the various structural elements required for discharge of recirculating sewage into the sump tank of the distributor mechanism and for electrolytic operation of the control circuitry will not interfere with the free rotation of the sump tank and its associated sewage distributing structure.

Still other important objects of the invention, including certain significant details of construction, will be made clear or become apparent as the following description of the invention progresses.

In the accompanying drawings:

Fig. 3 is an enlarged, fragmentary, vertical, cross sectional view showing the detail of the uppermost portion of the center column and sump tank assemblies; and Fig. 4 is an essentially schematic diagram illustrating the hydraulic and electrical aspects of the preferred embodiment of an installation made in accordance with this invention.

Figure 1:
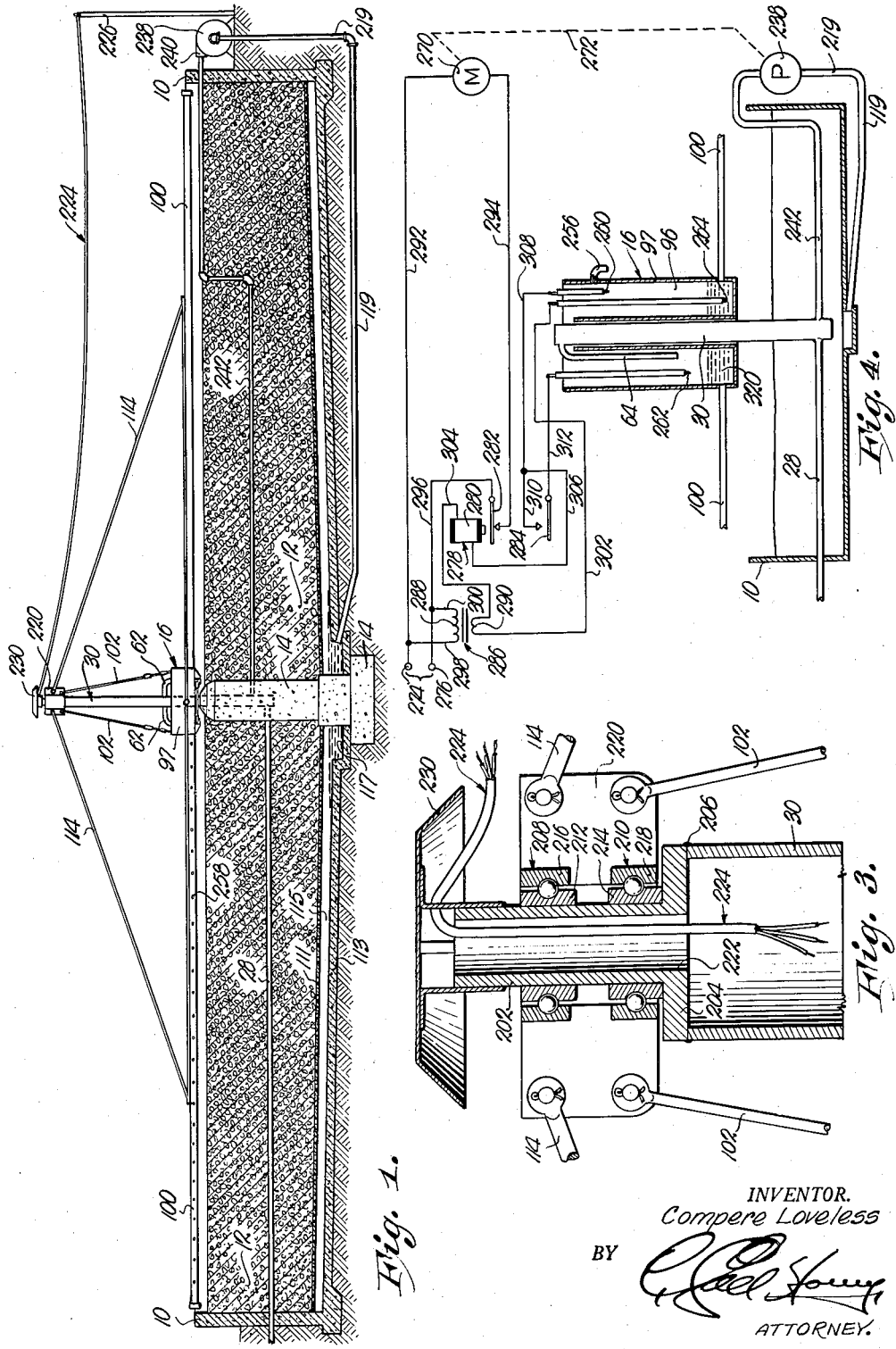
Fig. 1 is a view partially in side elevation and partially in vertical cross section through a sewage treating and purifying installation as contemplated by this invention.

Referring now to the drawings, it will be observed that much of the structure illustrated for clarity of explanation of the improvements effected by the present invention is the same as or similar to corresponding structure illustrated and described in my above-mentioned patent. Accordingly, reference is made to said patent for further information concerning the general nature and relationships of such part of the overall structure.

For convenience in making such reference to said patent, the structural elements and parts utilized in the apparatus of the present invention which are analogous to parts described in said U.S. Letters Patent No. 2,758,875 have been identified in the drawings of this application with the same reference numerals running between 10 and 118 inclusive as were used in said patent.

A filter bed 10 filled with rock or the like 12 therein for supporting the bacterial growth necessary to so-called "trickle filter action" has an upstanding base 14 located centrally thereof upon which is rotatably mounted a rotary sewage distributing assembly 16. Bed 10 is provided with a perforate or foraminous false bottom 111, which may be of tiles or the like, upon which the rock 12 is supported. False bottom 111 is sufficiently spaced above the floor 113 of bed 10 or otherwise so formed as to present a sloping path as at 115 along which filtered material emerging from the bottom of rock 12 may run into a suitable collecting basin portion of floor 113 as at 117. A draw-off pipe 119 communicates with the basin 117 for use in drawing off filtered material therefrom for discharge into a final clarifier or the like (not specifically illustrated, but assumed to be interposable in the pipe 119, if desired).

An elongated, upstanding, tubular, sectional center column 30, whose lower section 131 is closed at its lowermost end and embedded in the concrete base 14, has its upper section 133 rigidly mounted on the concrete base 14, and extended thereabove, being anchored to the base 14 by means of a securing and leveling plate 32 welded to the column as at 34 and attached to the base 14 by means of opposed nuts 56 and 58 upon a number of bolts 24 extending through the upper edge 26 of base 14 and each including an anchor portion 22 embedded in the base 14. Plate 32 and nut and bolt structures 24, 56 and 58 are covered over by a protective covering 60, there being a sealing gasket 54 interposed between plate 32 and upper edge 26 of base 14 for effecting a seal at the abutting ends of sections 131 and 133. If desired, section 131 could be replaced by tile, as is conventional in some constructions.

A sewage input or feed pipe 28 leads from a source of sewage material external to the apparatus of this invention into base 14 and the lower section 131 of tubular center column 30, such feed pipe 28 being coupled with the center column 30 in any suitable manner adjacent the lowermost end of the latter.

Above the level of bed 10, the upper section 133 of column 30 is provided with a number of openings 46 each having a pipe section 48 coupled therewith, such as by welding to column 30 as at 52, and with a closure plate 42 within the section 133 of column 30, and welded thereto as at 44, for closing the latter just above the openings 46. To each pipe section 48 there is connected by a flexible coupling 66 having a packing 70, a tubular elbow joint 62 provided with a downturned leg 64.

Disposed in circumscribing relationship to the column 30 below the openings 46 is an annular sump tank 96 having an outer wall 97 and an inner wall 99. Outer wall 97 is provided with a number of holes 98 each in communication with a pipe section 110 mounted on the wall 97. To each pipe section 110 is connected by a coupling 112 having a packing 115, an elongated, horizontal, perforated distributor arm 100.

Below the sump tank 96 there is provided an annular, horizontal guide plate 36 attached to the column 30 by welding as at 38 to present an annular bearing surface 40 upon which ride a number of rollers 106 secured to the bottom of sump tank 96 by means of brackets 108. The sump tank 96 is rotatably mounted on column 30 by means of the cooperative relationship between bearing surface 40 of plate 36 and the rollers 106 and the provision of tie rods 102 having turnbuckles therein oppositely connected to the sump tank 96 and an element rotatably mounted on the column 30 above the sump tank 96 and hereinafter more fully identified and described. Tie rods 114 having turnbuckle sleeves 118 therein are also provided and oppositely connected to the arms 100 outwardly of the sump tank 96 and the mentioned element rotatably mounted on column 30 above sump tank 96.

As will hereinafter become clear, it is necessary in the apparatus of this invention to provide means of egress for certain electrical conductors from the vicinity directly above the sump tank 96 without interfering with the free rotatability of the latter. Accordingly, there is provided on the uppermost end of the column 30 an elongated, tubular member 202 having an outturned flange 204 at its lowermost end, flange 204 resting atop the column 30 and being welded thereto as at 206. A pair of ball bearings generally designated 208 and 210 have inner races 212 and 214 respectively which are secured to the member 202 and outer races 216 and 218 respectively which are secured to the aforementioned rotatable element 220. Element 220 is rotatably mounted upon the member 202 by the bearing members 208 and 210 and has tie rods 102 and 114 connected therewith in any suitable manner as will be clear in Fig. 2. The longitudinal bore 222 of member 202 thus provides a path for egress from the interior of column 30 of a number of electrical conductors generally identified by the numeral 224, conductors 224 being extended laterally over the bed 10 to a suitable pole or the like 226. At their lower extremities the conductors 224 find egress from the interior of column 30 to a position above the sump tank 96 through a number of holes 228 provided in the column 30 above closure plate 42. An inverted, pan-like rainshield 230 is preferably mounted upon the uppermost end of member 202 to prevent the entry of rain or the like within that interior portion of column 30 disposed above plate 42 and through which the conductors 224 pass.

The recirculation system of the apparatus of this invention includes, besides the draw-off pipe 119 (which may be understood as delivering to an unillustrated final clarifier where recirculation is to be from the latter back to the bed 10), a conduit 219 coupling the pipe 119 (or the output of the mentioned final clarifier) to the inlet port of a pump 238 having an outlet port 240. Pump outlet port 240 is coupled with a pipe 242 which extends across the bed 10, into the base 14 and is coupled with the center column 30 adjacent the lower end of the latter for discharging recirculated sewage material therefrom into the interior of the column 30.

It may be observed at this point that the outer wall 97 of sump 96 is preferably provided adjacent its upper extremity with an outlet opening 254 to which may be coupled a downwardly directed tubular elbow 256 externally of wall 97, opening 254 and elbow 256 serving as a drain or discharge port in the event that the sump tank 96 is filled to a level which would otherwise cause its overflow. It may also be noted that the arms 100 are provided with pluralities of perforations 258 spaced longitudinally thereof in rows, perforations 258 being appropriately oriented on each of the arms for providing the entire distributor assembly 16, including the sump tank 96, with a reaction type rotating force for rotating the same upon the column 30 as liquid sewage material is discharged from the outlet openings 258 in arms 100. In this connection, it may also be observed that the bearing means 208, 210 and 106 chosen for rotatably mounting the sump tank 96 and arms 100 upon the column 30 have been selected with particular regard to their low frictional characteristics.

Figure 2:
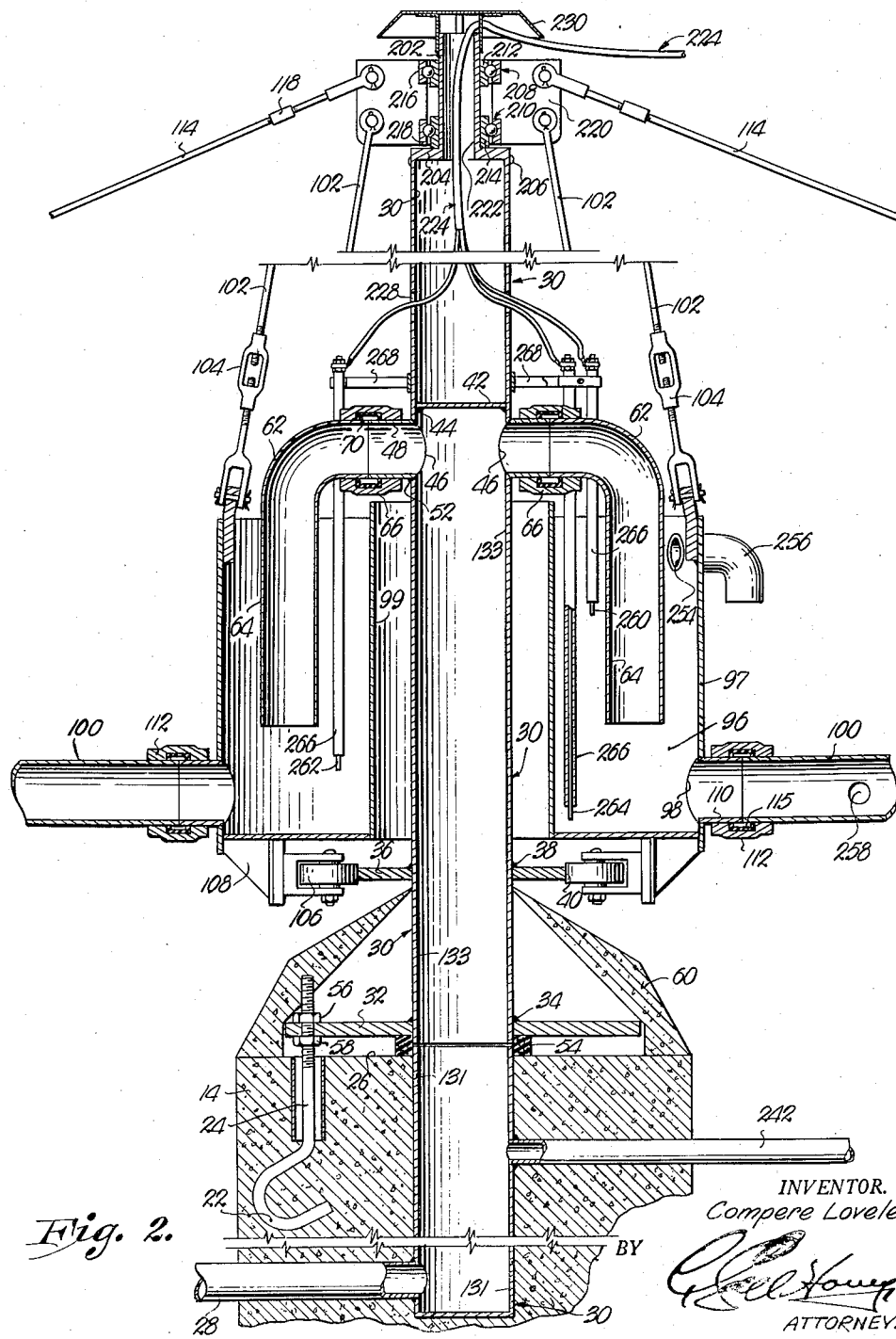
Fig. 2 is an enlarged, fragmentary, vertical, cross sectional view through the center column and sump tank portion of the installation of Fig. 1.

Referring now particularly to Figs. 2 and 4, there are provided three elongated, electrically conductive electrode rods 260, 262 and 264 of different lengths, each having a tubular, electrically insulating covering 266 of plastic or the like extending over all of its length except a small portion adjacent the lowermost end thereof. The electrodes 260, 262 and 264 are rigidly mounted on the column 30 by suitable brackets 268 attached to the column 30 above the sump tank 96, the coverings 266 providing convenient electrical insulation of the electrodes 260, 262 and 264 from the column 30 and bracket means 268. The provision of the coverings 266 also finds primary significance in the manner in which it tends to prevent false electrolytic circuits between the electrodes 260, 262 and 264 arising from the fouling thereof by solid bodies within the sewage material discharged into the sump tank 96. As constructed with coverings 266 thereon, the electrodes 260, 262 and 264 are actually disposed to electrical contact with sewage material within tank 96 only adjacent their lowermost ends. It will be apparent from Fig. 2 that the brackets 268 mount the electrodes 260, 262 and 264 in such manner that they will not come into contact within sump tank 96 or interfere with the rotation thereof upon column 30.

Referring now more particularly to the schematic representation of the system contained in Fig. 4, it will be seen that there is provided an electrical motor 270 operably coupled with the pump 238 by any suitable means 272 for mechanical operation of the pump 238 by the motor 270 whenever the latter is energized.

A source of electrical power is represented in Fig. 4 by a pair of terminals 274 and 276 which may be the two sides of a conventional, electrical power line. The control circuitry of the system includes a relay generally designated 278 having an operating coil 280, a normally closed, single pole, single throw relay switch 282 and a normally open, single pole, single throw relay switch 284. In the preferred embodiment a voltage step-down transformer 286 having a primary winding 288 and a secondary winding 290 is also provided.

The motor 270 is coupled with power terminal 274 through an electrical conductor 292, and oppositely connected with power terminal 276 by a series circuit traceable through a conductor 294, the relay switch 282 and a conductor 296. The primary winding 288 of transformer 286 is coupled with power conductor 292 by conductive means 298 and with power conductor 296 by a conductor 300. One side of the secondary winding 290 of transformer 286 is coupled with the electrode 264 by a conductor 302, the other side of secondary winding 290 being coupled with one side of coil 280 by a conductor 304. The other side of coil 280 is coupled with electrode 260 by conductors 306 and 308 and with one side of relay switch 284 by conductors 306 and 310. The other side of relay switch 284 is coupled with electrode 262 by a conductor 312.

As will be apparent, the electrode 264 serves as the "ground" or common electrode and could conceivably be replaced by the structure of the metallic sump tank 96 itself if means were available for conveniently making an electrical connection to the latter; however, in order not to interfere in any way with the rotatability of the sump tank 96 upon column 30, it has been found desirable to accomplish the common side of the electrolytic connection with sewage material within the sump tank 96 by means of the third electrode 264.

In operation, assuming the sewage material within the sump tank 96 (which is indicated for purposes of identification in Fig. 4 by the numeral 320), is at a level covering the exposed portion of electrode 264 but below electrolytically contacting relationship with the exposed portion of electrode 262. In such condition of the system, no electrolytic circuit will be completed between the common electrode 264 and either of the other electrodes 260 or 262. Thus, the initial energizing circuit for coil 280 hereinafter to be traced and obviously requiring an electrolytic connection between electrodes 264 and 260 remains broken or incomplete. Accordingly, the coil 280 is deenergized, relay switch 282 is closed and relay switch 284 is open. With the switch 282 closed the motor 270 is energized through a circuit traceable from power terminal 274 through conductor 292, motor 270, conductor 294, closed relay switch 282 and conductor 296 to power terminal 276.

Energization of the motor 270 actuates the same to operate the pump 238. Operation of the pump 238 withdraws sewage material from the bed 10 (or a final clarifier interposed between pipe 119 and conduit 219, as the case may be) through the conduit 219 and propels the same through pipe 242 to a point of discharge of such recirculated material into column 30 for delivery to the sump tank 96.

When the level of the sewage material 320 within sump tank 96 rises sufficiently for an electrolytic contact to be made with electrode 262, and an electrolytic circuit thereby completed between electrode 264 and electrode 262, no change in the condition or operation of the remainder of the recirculation control system occurs by virtue of the open condition of the relay switch 284 with which the electrode 262 is solely coupled.

Motor 270, therefore, continues to operate unless and until the level of sewage material 320 rises to an extent effecting an electrolytic contact thereof with the exposed portion of electrode 260.

Assuming, however, that during operation of the sewage recirculation system just described, external sewage material should commence to be introduced through the feed pipe 28 and center column 30, the level of sewage material 320 within sump tank 96 would rise until electrolytic contact thereof was established with the exposed portion of electrode 260. Obviously, if motor 270 and pump 238 were to be continued in operation, the liquid sewage material 320 would simply overflow through the outlet 256 of sump tank 96 without distribution over the bed 10 as is desired. In order to provide for inactivation of the recirculation system during introduction of external sewage into the sump tank 96 in amounts equal to the capacity of the sump tank 96 and distributing arms 100, the completion of an electrolytic circuit between electrode 264 and electrode 260 upon rise of the sewage material 320 into contact with the electrode 260 effects an energization of the coil 280, relay 278 through a circuit traceable from the secondary winding 290 of transformer 286 through conductor 302, electrode 264, the electrolytic path through sewage material 320 to electrode 260, thence through conductors 308 and 306 to coil 280, through the latter, then back to primary winding 290 through the conductor 304.

Energization of coil 280 opens relay switch 282 and closes relay switch 284. Opening of relay switch 282 breaks the above traced energizing circuit for motor 270, thereby deactivating the recirculation pump 238. Closure of relay switch 284 completes a holding circuit for the coil 280 of relay 278 traceable from conductor 306 through the conductor 310, now closed relay switch 284, the conductor 312, the electrode 262, the electrolytic path between electrode 262 and electrode 264 (which is obviously now also completed) and from electrode 264 through conductor 302 back to primary winding 290 of transformer 286. Such holding circuit maintains the coil 280 energized to prevent operation of motor 270 and the recirculation pump 238 so long as the level of sewage material 320 within sump tank 96 remains sufficiently high to maintain electrolytic contact with the electrode 262.

Upon cessation of the introduction of sewage material from an external source through the pipe 28 and column 30, or the reduction of same in an amount below the distributing capacity of arms 100, either of which will result in the level of liquid 320 falling below the point of electrolytic contact with the electrode 262, breaking of the electrolytic circuit between electrode 262 and electrode 264 will break the above traced holding circuit for coil 280. Since the initial energizing circuit for coil 280 traced through an electrolytic connection between electrode 264 and electrode 260 is also now broken, it will be apparent that coil 280 will be deenergized permitting relay switch 282 to close and relay switch 284 to reopen. Manifestly, upon reclosure of relay switch 282, motor 270 will again be energized to operate the recirculation pump 238. It has been found that this recirculation and control system is a preferred embodiment of which that which has just been described, is ideally suited to accomplishing all of the above-mentioned and other objects of this invention. Particularly notable is the manner in which such system allows for regular introduction of sewage material from an external source without any impediment or change, while at the same time providing for recirculation of sewage material already within the bed 10 when no external sewage is being introduced. Also significant is the manner in which the system automatically deactivates the operation of the recirculating pump 238 during periods of introduction of a capacity amount of external sewage, in order to prevent overtaxing the distributing portion of the apparatus or the wasteage of power, wear, time and the like on the recirculating pump 238 and prime mover 270 therefor.

It will be perceived by those skilled in the art that certain changes or modifications could be made from the precise structure disclosed for purposes of illustration without departing from the true spirit or intention of the invention. Accordingly, it is to be understood that the invention shall be deemed limited only by the scope of the appended claim.

Having thus described the invention, what is claimed as new and desired to be secured by Letters Patent is:

In sewage treating apparatus having a filter bed, a sump tank provided with outlet means for distributing sewage therefrom into said bed, means for supplying fresh sewage to said tank, and means including an electrically responsive flow controlling device for recirculating sewage previously introduced into said bed back into said tank, the improvement of which comprises means for controlling the amount of said recirculated sewage delivered to said tank responsive to the amount of said fresh sewage delivered to said tank comprising: a first electrically conductive electrode extending into the tank to a level substantially above the bottom of the tank; a second electrically conductive electrode extending into the tank to a lower level adjacent the bottom of the tank; a third electrically conductive electrode extending into the tank to a level intermediate said before-mentioned levels; a relay having an operating coil, a first, normally closed switch, and a second, normally open switch; a source of electrical power having a pair of terminals; circuit means coupling said first switch and said device in series with each other and with said terminals; circuit means coupling one side of said coil with said first electrode; means coupling said second electrode and the other side of said coil with said terminals; and circuit means coupling said second switch between said first electrode and said third electrode, sewage within the tank being adapted to successively contact only said second electrode, then electrolytically couple said second electrode with said third electrode and then electrolytically couple said second electrode with said first electrode as the level thereof within the tank progressively rises.

References Cited in the file of this patent
UNITED STATES PATENTS

| | | |
|---|---|---|
| 1,820,981 | LeFever | Sept. 1, 1931 |
| 2,355,760 | Trebler | Aug. 15, 1944 |
| 2,429,312 | Gillard | Oct. 21, 1947 |
| 2,758,875 | Loveless | Aug. 14, 1956 |